May 16, 1961 A. TORRICELLI 2,984,463
SYSTEM FOR DISINFECTING WATER
Filed May 9, 1958 3 Sheets-Sheet 1
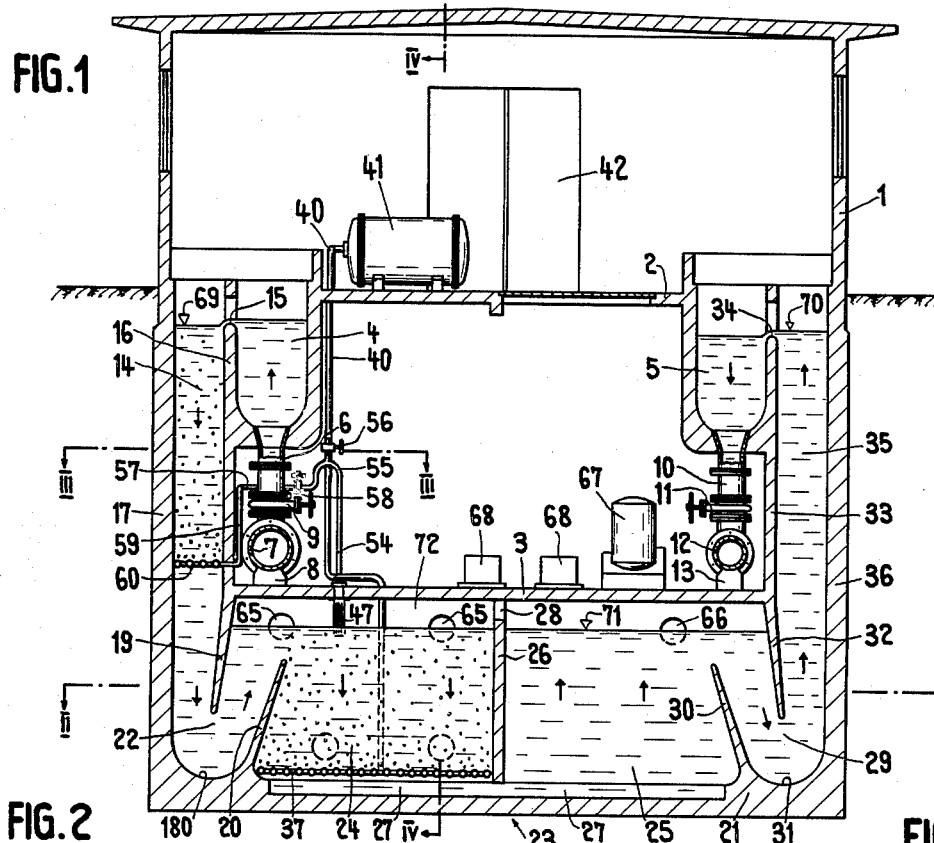
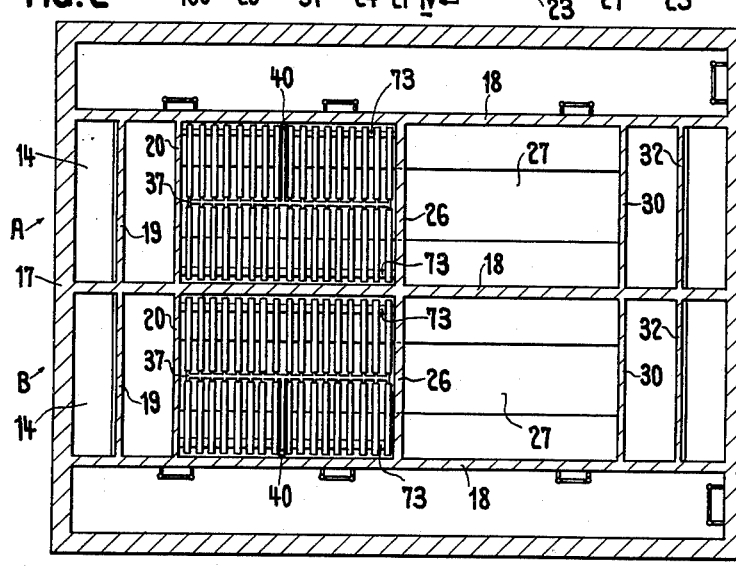
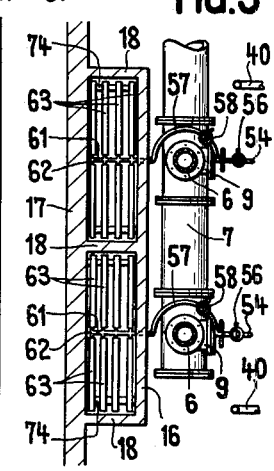
INVENTOR.
Alfred Torricelli INVENTOR.
Alfred Torricelli May 16, 1961  A. TORRICELLI  2,984,463
SYSTEM FOR DISINFECTING WATER
Filed May 9, 1958  3 Sheets-Sheet 3

INVENTOR.
Alfred Torricelli
BY Edward V. Connors
Atty.

United States Patent Office 2,984,463
Patented May 16, 1961

2,984,463
SYSTEM FOR DISINFECTING WATER

Alfred Torricelli, Falkenplatz 7, Bern, Switzerland

Filed May 9, 1958, Ser. No. 734,217

Claims priority, application Switzerland Aug. 31, 1951

3 Claims. (Cl. 261—21)

This application is a continuation-in-part of my U.S. patent application Serial No. 303,884, filed August 12, 1952 and now abandoned.

My invention relates to methods and means for disinfecting water.

The primary object of this invention is to introduce an ozonized gas into the water to be disinfected.

There are various difficulties in disinfecting water by means of ozonized air or other ozonized gas. In fact, it is impossible to cause pure ozone to directly act on the water. Ozone is always accompanied by a great mass of air or another gas, such as oxygen. The percentage of ozone is, for instance, about 1% with respect to the accompanying air. In prior methods, the residual gas, principally composed of air, is drawn along with the water and re-enters the ozonization chamber, thus impairing the dissolution of ozone in water. This presents a difficulty since in dissolving in water the ozone of ozonized air or another gas great difficulties are encountered because of the coefficient of repartition of the ozone between the gaseous and the aqueous phase, said coefficient varying with the temperature.

It is one of the objects of this invention to separate the residual gas from the water while the latter is still under its maximum pressure in order to prevent the dissolved ozone from escaping from the water before treatment is completed, which would no doubt be the case if the residual gas, whose ozone content is reduced, could continue its way by following the same path as the water.

The proportion of dissolved ozone in the water depends on the pressure. It increases with increasing pressure and decreases with decreasing pressure. In prior methods the ozonized air is injected to the water at low pressure which afterwards increases and then again decreases so that the ozone dissolved with increasing pressure partly leaves its dissolved state. Moreover, in these prior methods the speed of circulation of the water is very great in order to suck-in the ozonized gas. Therefore, in spite of a rather long path of the water through the installation there is no sufficient time available for performing appropriate disinfection. Furthermore, ozone is a very unstable gas and, therefore, on the long path through prior installations a substantial portion of the ozone is decomposed into $O_2$ along the reaction $2O_3 \rightarrow 3O_2$ so that the disinfecting action is further diminished.

It is a further object of this invention to remedy the above disadvantages by stabilizing a relatively important pressure in the ozonation chamber. In this way, before the ozone begins to decompose into oxygen, it acts on the germs to be destroyed in the water in the ozonation chamber. Since the pressure is practically constant in the ozonation chamber and at the most suitable value for dissolution of the ozone in water the velocity of the water in the ozonation chamber may be relatively small and, in consequence, the passage time may be sufficient for dissolution even at a relatively short path, while, on the other hand, the passage time is short enough to allow the ozone to develop completely its germinal action on the water, i.e., before it begins to decompose into oxygen. The practically constant pressure and the relatively low velocity of the water in the ozonation chamber also allow of remedying the above-mentioned difficulties caused by the repartition coefficient between the gaseous and the aqueous phase.

A further object of the invention is to inject ozonized gas into water flowing through an ozonation chamber which is hydraulically sealed under pressure and to accumulate a compressed cushion of non-dissolved gas above the water in the hydraulically sealed ozonation chamber.

A further object of the invention is to use non-dissolved gas for pre-ozonation of the water.

A further object is to produce pre-ozonation by secondary injection of non-dissolved residual gas by driving from the gas cushion by the over-pressure in the latter non-dissolved gas to the inlet water conduit leading to the ozonation chamber and by leading said gas in said conduit in counter-current to the stream of water in said conduit, the residual gas being thus allowed to move in said inlet water conduit away from the direction to the ozonation chamber to finally escape into the atmosphere. In this way any loss of undissolved ozone is practically avoided.

Other objects and features will be apparent as the following description proceeds, reference being had to the accompanying drawings illustrating, by way of examples, some embodiments of my improved installation. In these drawings Fig. 1 is a sectional elevation of the first embodiment, Fig. 2 is a cross sectional view taken along the line II—II of Fig. 1, Fig. 3 is a cross sectional view taken along line III—III of Fig. 1, Fig. 4 is a sectional elevation taken along the line IV—IV of Fig. 1, Fig. 5 shows on a larger scale a sectional view through the distributor for injecting ozonized gas into the ozonation chamber, this view being taken along the longitudinal axis of two oppositely disposed porous distributor tubes, Fig. 6 is, on a still larger scale, a sectional view of some porous tubes of the distributor along a plane parallel to the supply conduit of the distributor.

Figure 4:
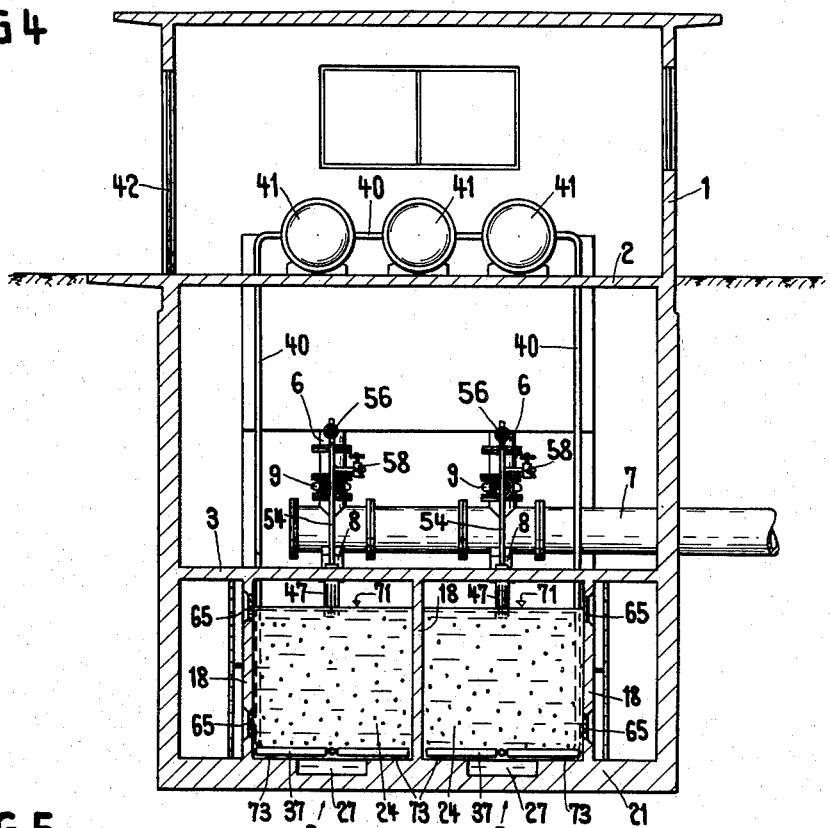

Referring now to Fig. 1, the improved installation is housed in a building structure 1 having two intermediate bottoms 2 and 3. On opposite sides of the bottom 2 there are an open inlet basin 4 for the water to be disinfected and an open outlet basin 5 for the disinfected water leaving the improved installation. The raw or polluted water is fed to the basin 4 through the bottom of the same by means of a branch pipe 6 of a feed conduit 7 supported on bases 8 of the bottom 3 and connected to a reservoir or a filter (not shown) or the like. The water supply to the basin 4 is adjusted by means of a valve 9. The disinfected water collected in basin 5 is discharged through a branch pipe 10 with valve 11 to an outlet conduit 12 supported on bases 13 of the bottom 3 and connected in any suitable manner to a reservoir (not shown) or to a water line system or the like. The basin 4 is in connection with a downtake conduit 14 by means of an overfall 15 formed by the upper edge of a wall 16 which, together with the side wall 17 of the building structure 1 and two of the walls 18 (Fig. 2), constitutes the conduit 14. The lower end of conduit 14 is in the shape of an elbow 22 formed by a curved wall portion 180 of the floor 21, the inclined lower portion 19 of wall 16 and an inclined baffle 20 integral with the floor 21. The elbow 22 provides for a smooth deflection of the water to reduce friction losses and opens into an ozonation chamber 23 divided into a diffusion compartment 24 and a disinfection compartment 25 by means of a partition 26 integral with two of the walls 18, the floor 21 and the bottom 3. A channel 27 in the floor 21 provides for interconnection of the compartments 24 and 25 below the partition 26 and one or more openings 28 in the upper portion of the partition 26 provide for connection between the compartments 24 and 25 above the water level 71 in the ozonation chamber 23. The outlet from the compartment 25 is obtained in a similar way as the entry to the compartment 24 by an elbow 29 of an outlet uptake conduit 35, the elbow providing for a smooth deflection of the water and being formed by an inclined baffle 30 integral with the floor 21, a curved wall portion 31 of the floor 21 and an inclined lower portion 32 of a wall 33 whose upper edge 34 forms an overfall for the water to flow from the uptake conduit 35 to the basin 5. The uptake conduit 35 is formed by the wall 33, two of the walls 18 and the side wall 36 of the building structure 1.

At the bottom of the compartment 24 there is provided a distributor 37 for ozonized gas, such as, for instance, ozonized air. The distributor 37 is supported on sockets 73 of the floor 21 and comprises distributor tubes 38 with outlet orifices 39 (Fig. 5), the tubes 38 being connected at a distance from one another to a supply conduit 40 coming from an ozonizer system 41 of well-known construction, mounted on the upper bottom 2 which can be reached through a door 42 in a wall of the building structure 1. On each of the pierced distributor tubes 38 is mounted by means of discs 64 a porous tube 43 made, for instance, from ceramic material, the pores of which form fine and finely distributed diffusors through which the ozonized air supplied to the interior of the tube 43 through the orifices 39 escapes in a very finely distributed condition into the water in the compartment 24. As illustrated in Fig. 2 the porous tubes 43 form together some sort of grid extending all over the surface area of the compartment 24 near the channel 27. The porosity of the porous tubes 43 is adapted to actual circumstances. Instead of pores of tubes other diffusors may be provided, such as, for instance, nozzles or Bunsen injectors with smaller or larger orifices and of smaller or larger number per unit area.

Figures 5, 6, 7:
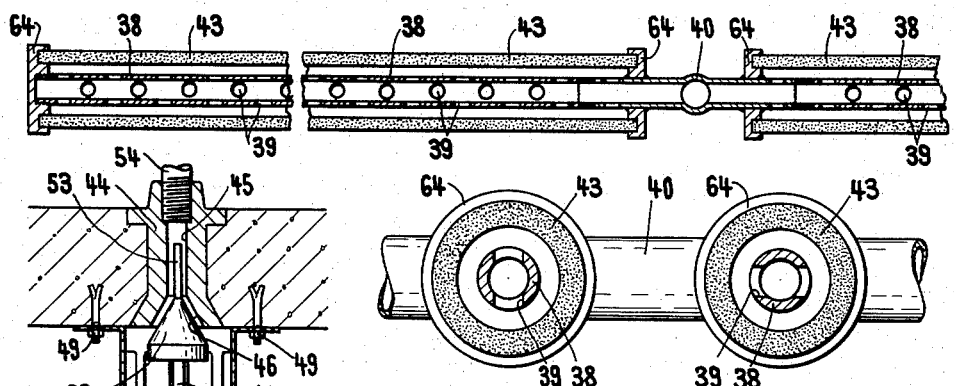
Fig. 7 is a sectional detail view, showing on a larger scale the valve controlling the outflow of residual gas from the ozonation chamber to the distributor in the intake water conduit for secondary injection of residual gas.

As shown in Fig. 1 and more particularly in Fig. 7 a valve sleeve 44 with a throughbore 45 is inserted into the bottom 3 and has a conical valve seat 46 turned towards the compartment 24. A float casing 47 is fixed to bottom 3 by means of screws 49 and has apertures 48 immersed in the water in the compartment 24 when the installation is in operation. The casing 47 contains a float 50 swimming on the water in compartment 24 and carrying, on a stem 51, a valve cone 52 cooperating with the seat 46 to close or to open the throughhole 45. A stem 53 permanently enters the throughhole 45 to guide the cone 52 with regard to the seat 46. A pipe 54 is screwed into the wall of the bore 45 and extends from the sleeve 44 upwards (Fig. 1), then has a bow 55 with a cock 56 to bring the pipe 54 in communication with the outside, and from bow 55 onwards the pipe 54 has a horizontal portion 57 with a cock 58 to close and open the pipe 54, whereupon it extends along a downtake portion 59 to the connection of a distributor 60 supported in the downtake conduit 14 by means of bases 74. The distributor 60 is more particularly illustrated in Fig. 3 and is designed in the similar manner as the distributor 37 in the compartment 24, i.e., it comprises a supply conduit 61 which is connected to the downtake 59 and carries pierced distributor tubes 62 surrounded by porous tubes 63 fixed to the tubes 62 in the same manner as the tubes 43 to the tubes 38 of the distributor 37 and through the pores of which residual gas flowing through the pipe 54 from the gas cushion above the water level 71 in the ozonation chamber 23 enters in a very finely distributed condition into the downward water stream in the intake conduit 14, where it rises towards the level 69. The porous tubes 63, whose pores may have a larger size than the pores of the tubes 43, form some sort of grid extending all over the surface area of the conduit 14 (Fig. 3) and lying at a higher level than level 71, for instance, 1 to 1½ m. above level 71 in the ozonation chamber 23. The size of the pores of the tubes 63 is adapted to actual circumstances. Instead of pores of tubes other diffusors may be provided, such as for instance nozzles or Bunsen injectors with smaller or larger orifices and of smaller or larger number per unit area.

As shown in Figs. 2 and 4, there are two separate systems A and B of the above described ozonation chamber 23, the basins 4 and 5, the intake 14 and the outlet 35 with the corresponding distributors 37 and 60 and the corresponding accessories so that one of the two systems may be in operation while the other system may be out of operation for cleaning or other purposes. Also both systems may simultaneously operate. The installation may, of course, also comprise only one such system or more than two systems.

In Figs. 1 and 4, 65 and 66 designate sight glasses to inspect the process in the compartment 24 or 25 respectively. For such inspection purposes, any well-known illuminating means (not shown) may be provided in the chamber 23.

In Fig. 1 an air drying means 67 and air compressors 68 are mounted on the bottom 3. These accessories as well as the remaining part of the ozonation system, which are well known in the art, do not form part of my invention and, therefore, need not be described in detail.

The cocks 56 and 58 serve for removing air from the ozonation chamber 23 when filling the installation with water to prepare it for operation. For that purpose, cock 56 is opened and cock 58, being at a lower level than cock 56, is closed. Therefore, the water supplied through the intake conduit 14 after having opened the valves 9 and 11 and rising in the ozonation chamber 23 applies pressure to the air contained in the chamber above the water level and urges some of it through the open valve 46, 52, the pipe 54 and the open cock 56 to the atmosphere, while no water can enter the pipe 59 due to the closed cock 58. With the rising water level 71 also the float 50 with the cone 52 is lifted until the cone 52 fits the seat 46 and air can no longer escape from the space 72 above the water level 71 and in the space 72 there remains a compressed gas cushion of constant pressure. If, as an example, the height above floor 21 of the water column in the downtake conduit 14 amounts to six meters and the height above floor 21 of the water column in the ozonation chamber 23 to two meters, the pressure of the compressed gas cushion in the space 72 is four meters water column. After the valve 46, 52 having been closed by the water rising in the chamber 23, cock 56 can be closed and cock 58 opened. The installation is now ready for operation and the ozonation chamber 23 is hydraulically sealed by the water columns in the conduits 14 and 35. The valve 46, 52 may be replaced by any other suitable valve known in the art.

The water in the basin 4 flows over the overfall 15 into the downtake conduit 14 and in the latter downwards, then is deflected by the elbow 22 and enters the compartment 24 below the compressed gas cushion 72. In compartment 24 it flows downwards and after having passed the distributor 37 flows through the channel 27 to the bottom of the compartment 25 where it rises and flows below the gas cushion 72 towards the elbow 29. The latter deflects it and thereafter the water rises in the uptake conduit 35 with practically the same velocity as it descended in the intake conduit 14 and finally flows over the overflow 34 into the basin 5 where it is under the influence of atmospheric pressure.

In the operation condition as shown in Fig. 1 the height of the water column above floor 21 in the intake conduit 14 is about three times the height of the water column in the ozonation chamber 23. When the water flows through the installation a small head of water is automatically established between the inlet level 69 and the outlet level 70, i.e. the level 69 at the intake lies but slightly higher than the level 70 at the outlet, such as, for insance, ten centimeters or some multiple thereof. Suitable heights of the water column above floor 21 in the intake conduit 14 amount, for instance, to three to five times the water column above floor 21 in chamber 23. A suitable height of the water column above floor 21 in the ozonation chamber 23 with regard to efficient disinfecting action is, for instance, two meters. The height of the compressed air cushion 72 may, for instance, amount to 0.25 m. In order to obtain as small an over-all height as possible of the installation while providing sufficient passage time of the water for an efficient ozonizing action, the cross sections of the intake conduit 14 and of the diffusion compartment 24 may at a given level 69 be chosen so that the velocity of the down flowing water in the conduit 14 is five to six times the velocity of the down flowing water in the diffusion compartment 24. In the embodiment of Fig. 1 the cross section of the disinfection compartment 25 is identical to that of the compartment 24 so that the passage time and the velocity of the water rising in the compartment 25 is the same as in the compartment 24, such as, for instance 0.8 m./min., while the velocity in conduit 14 may for instance amount to 4.5 m./min.

It is understood that the above-mentioned and all other numerical values cited in this specification are merely given by way of examples and will in no way restrict the scope of my invention.

When the ozonizer 41 works in a well-known manner the ozonized air or other gas containing, for instance, 1% ozone of 100% gas weight, is driven out of the pores of the tubes 43 of the distributor 37 at a pressure which may be rather small, for instance, about 0.3 to 0.5 m. water column above the pressure existing in the ozonation chamber 23 at the level of the porous tubes 43, and escapes in very fine and very finely distributed bubbles all over the surface area of the diffusion compartment 24 into the water in the latter. The rising gas not dissolved in the water of the compartment 24 enters the compressed gas space or cushion 72 above level 71. The residual gas is thus separated from the water soon after the injection at 37 and while the water is still under a considerable pressure. This residual gas still contains a small proportion of ozone due to the repartition phenomenon between the gaseous and the aqueous phases. The ozone contents in the residual gas are a function of the concentration of the ozone produced by the ozonizer, the degree of the oxidizability of the water and of the rapidity of the oxidation by the ozone of the substances contained in the water, the pressure in the ozonation chamber 23 and the dose of ozone injected per cubic meter of water to be treated. The residual gas entering the space 72 increases the pressure in the compressed gas cushion. Even on the occurrence of a slight pressure increase, the compressed gas cushion 72 is extended and lowers the water level 71 and with it the float 50 and the valve cone 52. On the slightest lowering of the water level 71 (e.g. some mm. or less) the valve 46, 52 opens and some residual gas flows under the influence of the gas pressure in the space 72, which is higher (for instance by one meter water column) than the pressure in the conduit 14 at the level of the distributor 60, through the valve 46, 52 and the pipe 54 to the distributor 60, lying, for instance, three meters below level 69. From the distributor 60 the gas escapes through the pores of the tubes 63 in fine and finely distributed bubbles all over the surface area of conduit 14 into the latter. From the above it follows that residual gas can only escape from the gas cushion when the pressure in this cushion exceeds the value given by the sealing water columns in the conduits 14 and 35. The down flow velocity of the polluted water in the downtake conduit 14 fed from the basin 4 over the overfall 15 is chosen in such a way (for instance 4 to 5 m./min) that the gas bubbles escaping from the distributor 60 are not taken along by the water in the conduit 14 down to the chamber 23 but rise in the water during a time sufficient to dissolve practically the whole rest of ozone in the residual gas before the latter escapes to the atmosphere at the level 69. In this way, the ozone still present in the residual gas (for instance 5 to 10% of the pure ozone contained in the gas initially injected through the distributor 37) is completely used for preozonation of the water in the conduit 14, i.e., before its entrance into the compartment 24. Therefore, my improved method and installation offer the possibility of using all the ozone, without any practical loss, produced by the ozonizer, which has never been possible with prior methods and means. That advantageous manner of pre-ozonization is due to my novel hydraulically sealed ozonation chamber with its compressed gas cushion. My novel chamber permits purifying quickly and with a remarkable safety even important quantities of the most polluted waters with very small quantities of ozone owing to the development in the best conditions of the strong germicidal properties of ozone.

The preozonation of the water has an important influence on the sterilising or disinfecting action in the compartments 24, 25 of the chamber 23. Due to the pre-ozonation the disinfection in these compartments is obtained quicker because it has already been initiated in the conduit 14 and maximum contents of ozone dissolved in the water are very quickly obtained in the diffusion compartment 24. Such high contents of ozone in the water of the compartment 24 would never be so quickly reached if the rapidly oxidizable substances contained in the water to be treated would not have been eliminated wholly or partially by the above-described pre-ozonation in the intake conduit 14. When the pre-ozonized water arrives through the elbow 22 in the diffusion compartment 24, the water, already from the beginning, requires less ozone because the most rapidly oxidizable substances contained in the polluted water have already been partially eliminated in the conduit 14. This is one of the reasons why my novel method and means require a considerably smaller dose of ozone than prior methods and results in a considerable reduction of ozone producing means and of the entire installation and, in consequence, results in a considerable reduction of the prime and operating costs. Recent tests have proved that with a hydraulic pressure of for instance 6 to 7 m. water column above the distributor 37 in the ozonation chamber 23 my method is very advantageous as to economic conditions.

The water arriving in the compartment 24 flows downwardly vertically and/or obliquely towards the distributor 37 and is continuously traversed by fine rising bubbles of ozonized gas, the contents of pure ozone of these bubbles being the greater, the nearer they are to the distributor 37. Therefore, the water on its downflow in the compartment 24, in counter current to the rising gas bubbles, is continuously enriched with ozone. The highest percentage of ozone dissolved in water is reached on the water passing the distributor 37. However, the percentage of ozone dissolved in water is near to its highest value already at the top of the compartment 24, soon after the entry of the water into compartment 24. When, afterwards, the water enters the disinfection compartment 25 through the channel 27 and rises vertically and/or obliquely in said compartment it is no longer traversed by gas bubbles. In the compartment 25 the water is tranquilized and the disinfecting action completed. Due to the pressure in the chamber 23 the ozone dissolved in the valve remains in solution in the compartment 25 and is only minimized in so far as it is decomposed under the action of oxidizable substances still contained in the water or of catalyst agents in the water. The prolongation of the germicidal action of ozone in the compartment 25 permits obtaining a thorough disinfection with a minimal quantity of ozone.

In summary, the water traverses the ozonation chamber 23 under a pressure and under conditions which guarantee a rapid and quasi-complete dissolution of the ozone while maintaining this gas dissolved until the water leaves the ozonation chamber. Moreover, the gaseous mass in the cushion 72, principally composed of air, escapes from the ozonation chamber without being swept along with the water. Owing to the provision of the cushion 72 of compressed gas and since this gas cannot be swept along with the water, the ozone dissolved in the latter has no possibility of leaving its dissolved state before it goes out of the ozonation chamber.

The following data are advantageous though not restrictive: A suitable time of passage of the water through both compartments 24, 25 will be five minutes, that is, 2.5 min. for the passage through each compartment shown in Fig. 1. That time will be sufficient for perfect disinfection of the water, if the latter contains 0.2 mg. $O_3$ per litre of water at the moment when the water passes from compartment 24 over to compartment 25 and 0.15 mg. at the top of the compartment 25 i.e., after the water has been in contact with the ozone during five minutes in the ozonation chamber 23. If the above values for dissolved ozone are not reached after 2.5 minutes and 5 minutes respectively the dose of ozone must be increased in order to compensate for the deficiency of ozone due to a more intense consumption provoked by the oxidizable substances of the water.

After having traversed the disinfection compartment 25 vertically and/or obliquely upwards, the water flows downwards into the elbow 29 and hence upwards through the uptake conduit 35 up to the level 70, where the still dissolved ozone is discharged and wherefrom the water falls over the overfall 34 into the basin 5 and is finally discharged through the branch pipe 10 and the outlet conduit 12 into a reservoir or pipe line system or the like (not shown).

While in the example illustrated in Figs. 1 and 2 the compartments 24 and 25 of the ozonation chamber 23 have the same length in the direction from elbow 22 to elbow 29, certain kinds of polluted water may require a disinfecting compartment 25 whose length is larger than that of the diffusion compartment 24, i.e. twice the length of the compartment 24 so that the time of passage through the compartment 25 is longer than through the diffusion compartment 24. The dimensions and numbers of the compartments may vary according to the nature of the water to be treated.

Any suitable check means, such as a valve or valves well-known in the art may, if desired, be provided for modifying the pressure in the gas cushion 72 or for changing the water head.

In certain cases, pre-ozonation in the intake conduit may be dispensed with and the residual gas in the space 72 may be directly discharged to the atmosphere without, of course, returning into the water.

Figure 8:
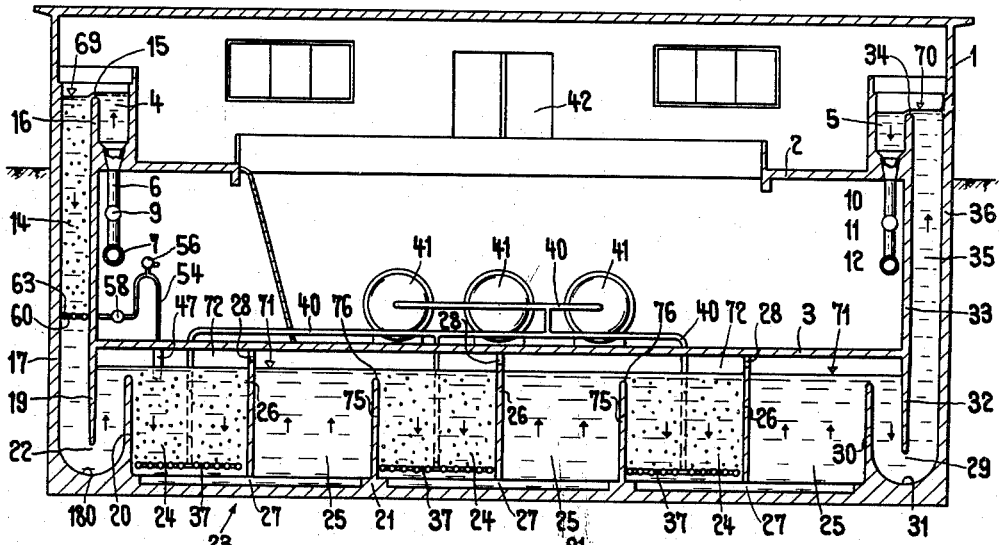
Fig. 8 is a sectional elevation of a second example having an ozonation chamber with several diffusion compartments and several disinfecting compartments.

Referring now to Fig. 8 like parts are designated by like reference characters as in the preceding embodiment.

The ozonation chamber 23 is considerably longer than in the first example and is subdivided into three pairs of diffusion and disinfecting chambers 24, 25. The number of these pairs may be less or greater than three. Between adjacent pairs of compartments partitions 75 integral with the floor 21 are provided with their upper edge 76 below the water level 71. This installation is especially suited for treating drinkable or industrial waters containing difficultly oxidizable undesirable foreign substances whose destruction requires a longer action of the ozone, at a relatively increased dose of ozone which can only be maintained by means of a system avoiding any loss of undissolved ozone during the treating period. When the water treated in the first pair of compartments 24, 25 enters the compartment 24 of the second pair by flowing over the edge 76 of the corresponding partition 75 another intense dissolution of ozone in the water already treated in the first pair occurs and the water, when flowing over the edge 76 of the partition 75 of the third pair of compartments 24, 25, is already purified to a much higher degree than at the end of the first pair and this purification will be completed by another intense treatment in the third pair of compartments 24, 25. If the passage time of the water through two compartments 24, 25 is equal to the values given in the preceding description, the passage time through the entire ozonation chamber will be three times longer than in the preceding example. For the rest, the explanations and statements of the foregoing description are also applicable to this installation and the novel method executed therewith so that further details need not be described in connection with Fig. 8. Also this second example might be used without pre-ozonation.

Figure 9:
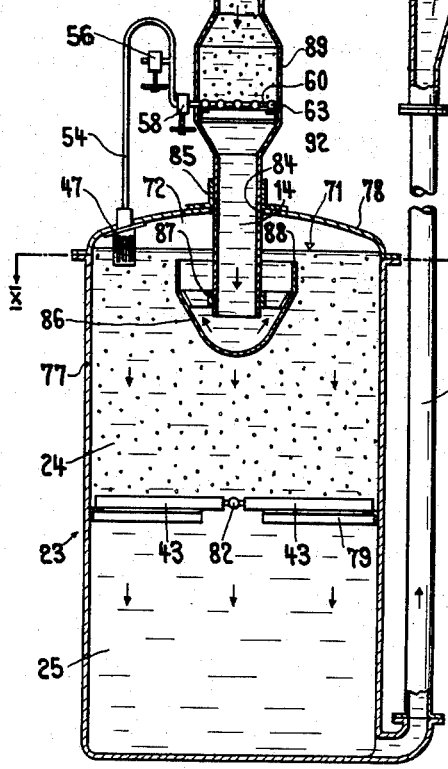
Fig. 9 is a sectional elevation of a third embodiment with the diffusion compartment lying above the disinfecting compartment.
Figure 11:
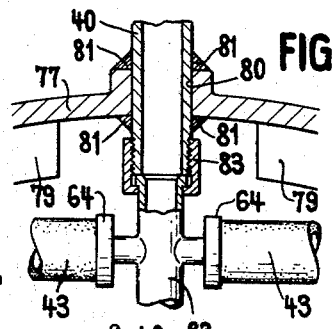
Fig. 11 is on a larger scale, a partly sectional view of a detail of the installation shown in Figs. 9 and 10
Figure 10:
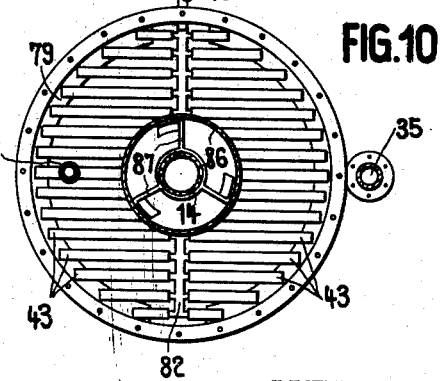
Fig. 10 is a cross sectional view taken along the line X—X of Fig. 9.

Referring to Figs. 9 to 10, corresponding parts are designated by like reference characters as in the embodiment illustrated in Figs. 1 to 7. The main difference of this third example from the two preceding examples resides in the fact that the disinfection compartment 25 of the ozonation chamber 23 lies below the diffusion compartment 24 and is not separated from the latter by a partition but only by the distributor 37 dividing the chamber 23 into two equal spaces. The ozonation chamber 23 is formed by a cylindrical casing 77 to the top of which a dome-shaped cover 78 is gas-tightly screwed. The distributor 37 for injecting ozonized gas is supported on brackets 79 fixed to the inner wall of the casing 77. The distributor 37 forms some sort of grid extending all over the circular cross sectional area of the ozonation chamber 23. The supply conduit 40 coming from the ozonizer 41 goes through a bore 80 of the casing 77 to which it is welded as at 81 (Fig. 11). Inside the casing 77 the end piece 82 of the conduit 40 is fixed to the remaining part of conduit 40 by means of a cap screw 83. From the end piece 82 the pierced distributor tubes 38 are branched off towards opposite side as in the distributor 37 of Figs. 1 to 7. The other details of the distributor construction are similar to those in Figs. 5 and 6 and the corresponding description with the exception that due to the circular cross section of the chamber 23 the porous tubes 43 are of varying length. The downtake inlet conduit 14 of circular cross section traverses a bore 84 of the cover 78 and is gastightly fixed to the same by means of a collar 85 welded to cover 78. The downtake conduit 14 opens into a water distributor 86 fixed in the upper third of the diffusion chamber 24 to the conduit 14 by means of a three-arm bracket 87. The water coming from conduit 14 and entering the water distributor 86 is smoothly deflected towards the top by the curved portion of the distributor 86 and quietly flows uniformly distributed all over the circumference of the distributor 86 over the upper edge 88 of the same into the compartment 24 hence it flows slowly down towards the distributor 37. The conduit 14, opening at its upper end (not shown) to the atmosphere, for instance, in a similar manner as in Fig. 1 or 8, has a widened portion 89 receiving the distributor 60 for pre-ozonization. This distributor 60 is mounted on a support 92 and is shaped in a similar manner as the distributor 37 in Fig. 10 to extend all over the circular cross sectional area of portion 89. Otherwise, the preozonization system is designed similarly to that of the preceding examples and, therefore, needs no further description. The intake conduit 14 could be given the diameter of portion 89 all over its length. The uptake outlet tube 35 ends in a casing 90 covered by a pierced plate 91 to provide for atmospheric pressure at level 70. The casing 90 also comprises the basin 5 to which the discharge conduit 12 including valve 11 is connected. For the rest, the explanations and statements of the foregoing description of my method and installation are also applicable to this third example and the novel method executed therewith so that further details need not be described in connection with Fig. 8. Also this third example might be used without pre-ozonation.

With my improved method it has already been possible to disinfect completely in 3½ minutes in the ozonation chamber 23 a subsoil water of normal chemical composition but heavily infected by 70,000 coli bacilli per cubic centimeter of water by injecting only 0.25 gr. of ozone per cubic meter of water to be treated and all of the injected ozone could be dissolved, except 0.06%. Parallel tests executed with the same water and with an ozonized gas of the same concentration have proved that with a prior method recognized to be economical and wherein my improvement is not used, twice the above-indicated dose of ozone was necessary to obtain an appropriate disinfection in 8 minutes.

A water richer in oxidizable substances will require a proportionally larger dose of ozone to obtain the same disinfecting effect. The dose of ozone necessary with my novel method can be found by experimentally determining the ozone quantity destroyed within five minutes when in contact with the water to be treated and by adding to that quantity 0.15 gr. $O_3$ per cubic meter of water to be treated.

While I have described and illustrated some examples of my invention I do not wish to restrict the scope of my invention thereto but reserve the right to make such modifications in the method and the shape, size and arrangement of the parts of the installations herein described as may come within the purview of the claims.

I claim:

1. An installation for purifying water with ozone comprising a fluid tight structure providing a compartment at the lower portion thereof, a first horizontally extending partition defining a top for the compartment, a second horizontally extending partition defining a top for the installation, a vertically extending partition for the compartment defining first and second chambers therein, means providing fluid passages through the vertical partition adjacent the top and bottom thereof, means forming a downtake inlet conduit at a side of the structure for the first chamber of the compartment, means forming an inlet basin adjacent the downtake inlet conduit, an inlet overfall between the inlet basin and the inlet conduit, upwardly and inwardly directed baffle means at the lower end of the downtake inlet to direct water to the upper portion of the first chamber of the compartment, means forming an uptake outlet conduit at a side of the structure for the second chamber of the compartment, means forming an outlet basin adjacent the uptake outlet conduit, an outlet overfall between the outlet conduit and the outlet basin, inwardly and upwardly directed baffle means at the lower end of the uptake outlet conduit to direct water from the upper portion of the second chamber of the compartment to the uptake outlet conduit, an ozonizer, fluid passage means leading from the ozonizer to the lower portion of the first chamber, fluid passage means leading from the upper portion of the first chamber to the lower portion of the downtake inlet conduit, and valve means in said last mentioned fluid passage adapted to open said passage before the level of water in the compartment has reached the level of the fluid passage adjacent the top of said vertical partition.

2. An installation for purifying water with ozone comprising a fluid tight structure providing a compartment at the lower portion thereof, a first horizontally extending partition defining a top for the compartment, a second horizontally extending partition defining a top for the installation, a vertically extending partition for the compartment defining first and second chambers therein, means providing fluid passages through the vertical partition adjacent the top and bottom thereof, means forming a downtake inlet conduit at a side of the structure for the first chamber of the compartment, means forming an inlet basin adjacent the downtake inlet conduit, an inlet overfall between the inlet basin and the inlet conduit, an inlet valve at the bottom of the inlet basin, upwardly and inwardly directed baffle means at the lower end of the downtake inlet to direct water to the upper portion of the first chamber of the compartment, means forming an uptake outlet conduit at a side of the structure for the second chamber of the compartment, means forming an outlet basin adjacent the uptake outlet conduit, an outlet overfall between the outlet conduit and the outlet basin, an outlet valve at the bottom of the outlet basin, inwardly and upwardly directed baffle means at the lower end of the uptake outlet conduit to direct water from the upper portion of the second chamber of the compartment to the uptake outlet conduit, an ozonizer positioned on the top of the installation, fluid passage means leading from the ozonizer to the lower portion of the first chamber, fluid passage means leading from the upper portion of the first chamber to the lower portion of the downtake inlet conduit, and float valve means in said last mentioned fluid passage adapted to open said passage before the level of water in the compartment has reached the level of the fluid passage adjacent the top of said vertical partition.

3. A method for disinfecting water comprising providing a compartment of water, maintaining the water in the compartment under hydrostatic pressure by providing a downtake column of water for an inlet and an uptake column of water for an outlet, the area of the compartment being much larger than the areas of the inlet and uptake columns injecting ozone and air into the compartment of water adjacent the bottom thereof so that the ozone and air are diffused over an area of water in the inlet, the ozone and air thus being diffused in a relatively quiescent state, reclaiming undissolved ozone and air over the water in the compartment, providing a float valve, maintaining a desired amount of reclaimed undissolved ozone and air over the water in the compartment by utilizing the level of the water to lift the float of the valve, forcing the undissolved reclaimed ozone and air from the compartment under the pressure of the water therein, leading the undissolved reclaimed ozone and air to the lower portion of the downtake inlet water column, discharging said reclaimed undissolved ozone and air therein in a direction which is opposite to the direction of flow of water in said downtake inlet water column so that the unozonized water is preozonized by being contacted by the reclaimed, undissolved ozone, practically all of the ozone being absorbed, and thereafter venting the remaining air to the atmosphere.

References Cited in the file of this patent

UNITED STATES PATENTS

| | | |
|---|---|---|
| 507,774 | Ball | Oct. 31, 1893 |
| 822,980 | Otto | June 12, 1906 |
| 850,416 | Bridge | Apr. 16, 1907 |
| 996,560 | Bradley | June 27, 1911 |
| 1,229,305 | Menzies | June 12, 1917 |
| 2,050,771 | Wait | Aug. 11, 1936 |
| 2,158,985 | Peet | May 16, 1939 |

UNITED STATES PATENT OFFICE
CERTIFICATE OF CORRECTION

Patent No. 2,984,463                                    May 16, 1961

Alfred Torricelli

It is hereby certified that error appears in the above numbered patent requiring correction and that the said Letters Patent should read as corrected below.

Column 10, line 48, after "the", second occurrence, insert -- compartment much larger than the area of water in the --.

Signed and sealed this 31st day of October 1961.

(SEAL)
Attest:

ERNEST W. SWIDER
Attesting Officer

DAVID L. LADD
Commissioner of Patents

USCOMM-DC